(12) United States Patent
Kuragaki et al.

(10) Patent No.: US 6,609,453 B2
(45) Date of Patent: Aug. 26, 2003

(54) CONTROLLER OF VACUUM BRAKE POWER BOOSTER

(75) Inventors: Satoru Kuragaki, Hitachi (JP); Tokuji Yoshikawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/790,528

(22) Filed: Feb. 23, 2001

(65) Prior Publication Data

US 2001/0017077 A1 Aug. 30, 2001

(30) Foreign Application Priority Data

Feb. 25, 2000 (JP) ........................................ 2000-054357

(51) Int. Cl.[7] ............................................... F15B 13/16
(52) U.S. Cl. ....................................... 91/367; 303/113.3
(58) Field of Search ............................... 91/367, 376 R; 60/547.1; 303/113.3, 114.3

(56) References Cited

U.S. PATENT DOCUMENTS

| | | | | |
|---|---|---|---|---|
| 3,856,105 A | * | 12/1974 | Lewis et al. ................. | 180/169 |
| 4,505,351 A | * | 3/1985 | Nishikawa et al. ........... | 91/367 |
| 6,006,648 A | | 12/1999 | Eckert | |
| 6,048,039 A | * | 4/2000 | Eckert ....................... | 303/113.4 |
| 6,185,498 B1 | * | 2/2001 | Linden et al. ........... | 303/113.3 |

FOREIGN PATENT DOCUMENTS

| | | |
|---|---|---|
| JP | 11-129889 | 5/1999 |
| JP | 11-505489 | 5/1999 |

\* cited by examiner

*Primary Examiner*—F. Daniel Lopez
(74) *Attorney, Agent, or Firm*—Crowell & Moring LLP

(57) ABSTRACT

A controller of a vacuum brake power booster which amplifies an input force of a brake pedal and outputs the amplified force to a brake device, is characterized by comprising a control signal generating means generating a plurality of kinds of signals for controlling the vacuum brake power booster, and a means for switching or selecting the plurality of signals on the basis of an input different from one of the brake pedal.

8 Claims, 4 Drawing Sheets

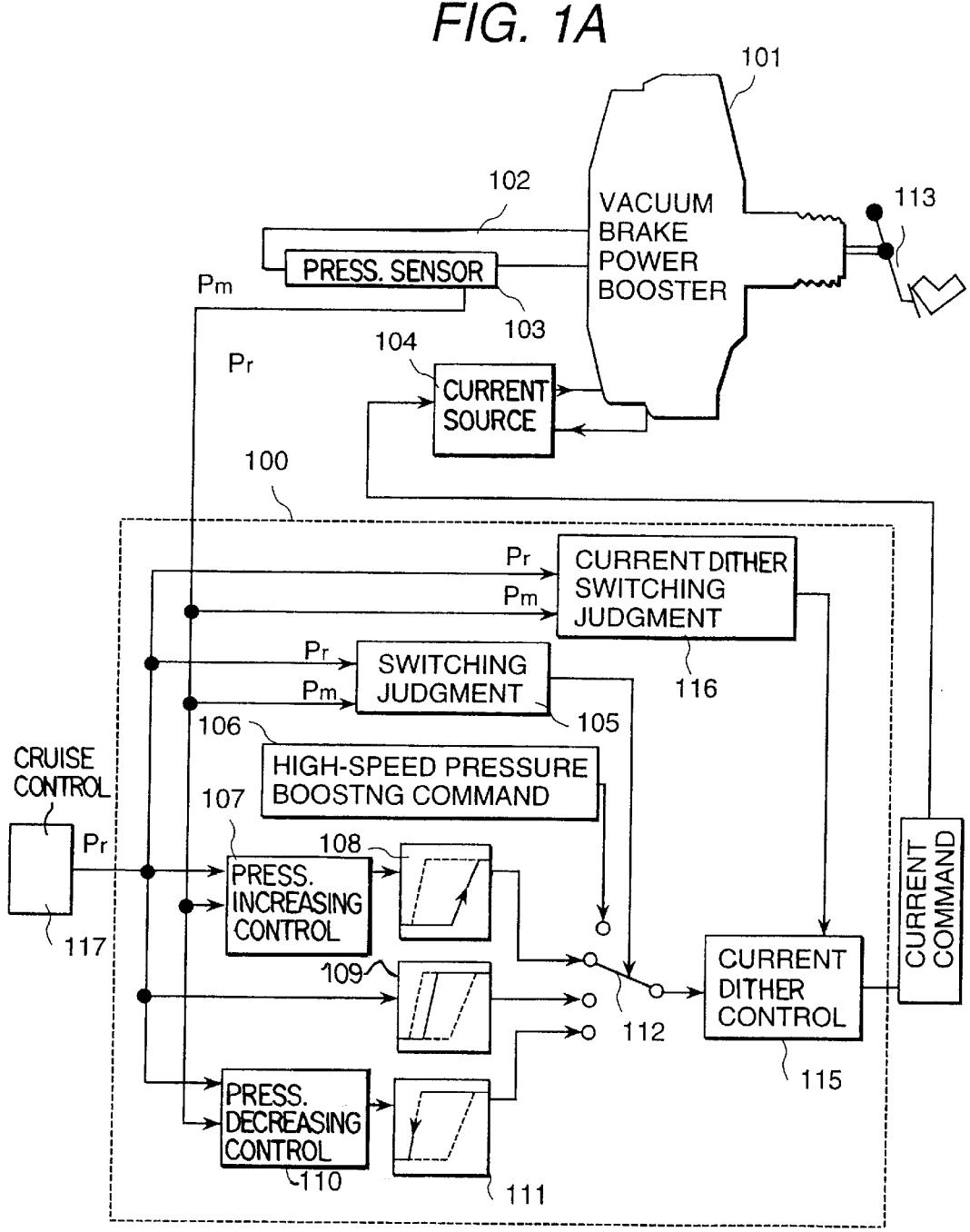

CONTROLLER OF VACUUM BRAKE POWER BOOSTER

BACKGROUND OF THE INVENTION

The present invention relates to a controller of a vacuum brake power booster for vehicles.

There is a power booster such as disclosed in JP A 11-129889. Further, JP w 11-505489 discloses a electro-mechanically controllable brake power booster irrespective of the intention of a driver, which has a function of opening/closing a valve mechanism, linking with a brake pedal operated by the driver and in addition thereto a function of opening/closing the valve mechanism, based on balance of electromagnetic force of a solenoid linked with the valve mechanism and spring force generated depending on displacement of the solenoid. The valve mechanism adjusts an air flow rate between a fixed pressure chamber and an operation pressure chamber of the brake power booster, causes a pressure difference between the fixed pressure chamber and the operation pressure chamber and applies pressure to a brake liquid in a master cylinder. The pressure is transported to a sleeve cylinder of each wheel and brakes the vehicle.

In such a brake power booster, when brake is effected irrespective of the intention of a driver (hereunder referred to as automatic brake), a flow rate of air passing through the valve mechanism being opened depends on an opening area of the valve mechanism determined according to balance of electromagnetic force of a solenoid, spring force, slide resistant force of a seal material and a difference between a atmospheric pressure and a pressure in the operation pressure chamber, and a pressure difference between the fixed pressure chamber and the operation pressure chamber or between the operation pressure chamber and atmospheric pressure. The air flow rate relates to the pressure difference between the fixed pressure chamber and the operation pressure chamber, and directly relates to a speed of pressure increase or pressure decrease in the master cylinder. For example, in the case where the automatic brake is operated at a negative pressure (for example, 350 hPa) in both the fixed pressure chamber and the operation pressure chamber, current is flowed into the solenoid to open the valve mechanism, air is flowed from the atmosphere into the operation pressure chamber and a pressure difference is caused between the fixed pressure chamber and the operation pressure chamber. When it reaches to a desired pressure, the current flow to the solenoid is stopped and the valve mechanism is closed. The pressure difference between the fixed pressure chamber and the operation pressure chamber is maintained while the valve mechanism is being closed, whereby the pressure in the master cylinder also is maintained. At this time, in the valve mechanism, the electromagnetic force caused by solenoid current, the spring force applied on the valve, force due to a difference between a pressure in the operation pressure chamber and an atmospheric pressure and a slide resistant force of the seal material partitioning the operation pressure chamber and the fixed pressure chamber are balanced. When the pressure in the master cylinder is further raised, current is flowed again to the solenoid to open the valve mechanism and causes air to flow into the operation pressure chamber. At this time, the pressure in the operation pressure chamber has become higher than when the valve mechanism was opened previously, and an inflow speed of air is slow even if the opening area of the valve mechanism is the same, whereby the rate of pressure increase in the master cylinder becomes slow. That is, a speed of increase or decrease of pressure in the master cylinder changes according to the pressure of the operation pressure chamber. However, from a viewpoint of a speed controller generating a pressure command in the master cylinder, the controller can be handled easier when a change in speed of increase or decrease of pressure in the master cylinder is smaller.

Further, in the case where the above-mentioned air is flowed into the operation pressure chamber, the slide resistant force of the seal material changes according to a change in coefficient of friction from a static friction coefficient to a dynamic friction coefficient. By the change in friction coefficient, the balance of the above-mentioned four forces is broken and the valve mechanism suddenly opens. In order to reduce the change in the slide resistant force of the seal material, a technique of current dither (DTER) exists, which periodically changes solenoid current so that the slide resistant force is always a slide resistant force in a region of a dynamic friction coefficient. By superimposing a dither (DTER) on the solenoid current, it is possible to open the valve mechanism more smoothly than when the dither is not superimposed. When closed, it is possible to close smoothly by applying a current dither in a similar manner. However, to superimpose the dither on the solenoid current means that the current always changes rapidly. Thereby, electromagnetic noises increase, which may be a cause that they make it unable for a driver to easily listen to radio broadcast, with the noises carried to the radio.

SUMMARY OF THE INVENTION

An object of the present invention is to provide a controller of a vacuum brake power booster in which the above-mentioned problems are solved and it is possible to effect pressure control without decrease in a speed of pressure increase or boost up which is caused by a change in an operation pressure chamber of the power booster.

The above-mentioned object is solved, in a controller of a vacuum brake power booster amplifying an input of a brake pedal and outputting to a brake device, by comprising control signal generating means generating a plurality of kinds of signals for controlling the power booster, and means for switching or selecting the plurality of signals on the basis of an input different from one of the brake pedal.

Particularly, a brake device comprises a brake power booster constructed by dividing a shell body inside into two, front and rear chambers by a center shell and dividing each of the two, front and rear chambers into a fixed pressure chamber and an operation pressure chamber by a front/rear power piston having a diaphragm, arranging, in at least a valve body supported by the rear power piston, a plunger connected to an input shaft extending from a brake pedal, a valve mechanism linked with the plunger and generating a pressure difference between the fixed pressure chamber and the operation pressure chamber and an annular solenoid case containing therein a solenoid controlling operation of the valve mechanism independently of movement of the plunger, thrusting each power piston by a pressure difference generated between the fixed pressure chamber and the operation pressure chamber, transmitting the thrust force to the output shaft through the solenoid case and transmitting a part of the reaction at that time to the input shaft through a reaction disk retained by the solenoid case and the plunger; a master cylinder connected to the input shaft; a pressure sensor measuring the pressure of liquid fully filling inside the master cylinder; a current source flowing current to the solenoid; and pressure controlling means for calculating one by one a current command value to be flowed to the solenoid, based on a pressure sensor value and a pressure command. In the above-mentioned pressure controlling means, a least 4 current commands, of high speed pressure increase, pressure increase, pressure retention and pressure decrease are calculated, any one of the above-mentioned 4 current commands is switched or selected to be a current command Ir. The 4 current commands Ir are optimized for pressure change. Particularly, for pressure increase for operating the brake device, a high speed pressure increase and an usual pressure increase, that is, 2 kinds of commands are provided, and a current command for the high speed pressure increase is set so that the area of opening of the valve mechanism is always maximum, and it is possible to make up a decrease in pressure increase speed due to the pressure of the operation pressure chamber described previously.

Further, the current command Ir includes current dither optimized to realize smoothness of the pressure change, the amplitude of the current dither changes depending on pressure command Pr and a value Pm of the pressure sensor. The amplitude of the current dither is made large when a difference between the pressure command and the value of the pressure sensor and made zero when the difference is small. That is, the amplitude of the current dither is made zero when the pressure control is managed well, and the current dither is made large when the difference between the pressure command and the value of the pressure sensor becomes large. Thereby, it becomes possible to control the amplitude of the current dither to be a necessary magnitude, and it is possible to reduce the electromagnetic noises.

BRIEF DESCRIPTION OF THE DRAWINGS

FIG. 1A is a block diagram of a construction of a controller of an embodiment of the present invention;

DESCRIPTION OF EMBODIMENT OF THE INVENTION

Figure 1B:
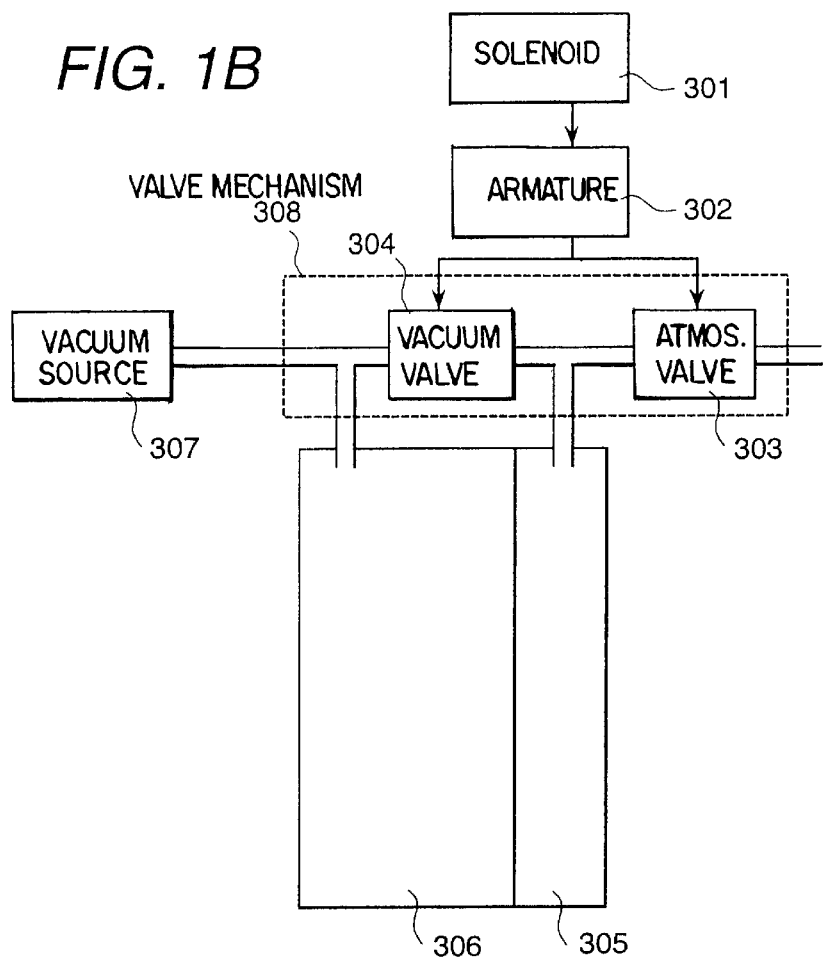
FIG. 1B is a block diagram of a part of a vacuum pressure booster used in FIG. 1.

FIG. 1A is a block diagram of a construction of a brake system including a controller 100 of a vacuum brake power booster (hereunder, referred to as the power booster) of the present invention. FIG. 1B is a block diagram shows a part of the power booster. It is composed of a brake pedal 113, the power booster 101 (for example, a power booster as described in JP A 11-129889), a master cylinder 102, a pressure sensor 103, a current source 104 for supplying current to a solenoid contained in the power booster 101 and actuating a valve mechanism of the power booster 101, a high speed pressure increasing current command means 106, a pressure increase (or boost) controlling means 107, means 108 for converting pressure-current command at a pressure increasing time, a means 109 for converting pressure-current command at a pressure retaining time, a pressure decrease controlling means 110, a means 111 for converting pressure-current command at a pressure decreasing time, a current command switch (selection) judging means 105 and a current switching or selecting means 112 for switching or selecting a current command on the basis of a result of the switch judging means 105.

The power booster 101 includes the valve mechanism 308 and the solenoid 301 arranged therein as schematically illustrated in FIG. 1B, for example. The valve mechanism 308 is composed of an atmosphere valve 303 and a vacuum valve. 304 each of which is connected to an armature 302 actuated by electromagnetic force applied between the armature 302 and the solenoid 301, with current being received from the current source 104. The power booster 101 further includes an operation pressure chamber 305 and a fixed pressure chamber each fluidly connected to a vacuum source 307 such as an intake pipe, a vacuum pump. The operation pressure chamber 305 and the fixed pressure chamber 306 are separated by a partition of a diaphragm having a connecting rod (not shown) which is connected to the diaphragm at one end and to a piston (not shown) of the master cylinder 102 at the other end. The fixed pressure chamber 306 and the operation pressure chamber 305 are fluidly connected to the valve mechanism 308 and the vacuum chamber 307. That is, the fixed pressure chamber communicates with the vacuum source 307 and with the operation pressure chamber 305 when the vacuum valve 304 is opened to cause the pressure in the operation chamber 305 to be equal to the pressure in the fixed pressure chamber 306. The operation pressure chamber 305 communicates with atmosphere to produce a pressure difference between the fixed pressure chamber 306 and the operation pressure chamber 305 when the atmosphere valve 303 is opened and the vacuum valve 304 is closed, and communicates with the fixed pressure chamber 306 when the atmosphere valve 303 is closed and the vacuum valve 306 is opened, whereby the pressure in both chambers becomes equal. The diaphragm is moved by a pressure different between the fixed pressure chamber 306 and the operation pressure chamber 305 and the movement of the diaphragm changes the pressure in the master cylinder 102 through the connecting rod and the piston. The piston also is connected to the brake pedal 113, so that the pressure in the master cylinder 102 is changed also by the brake pedal 113.

Figure 2:
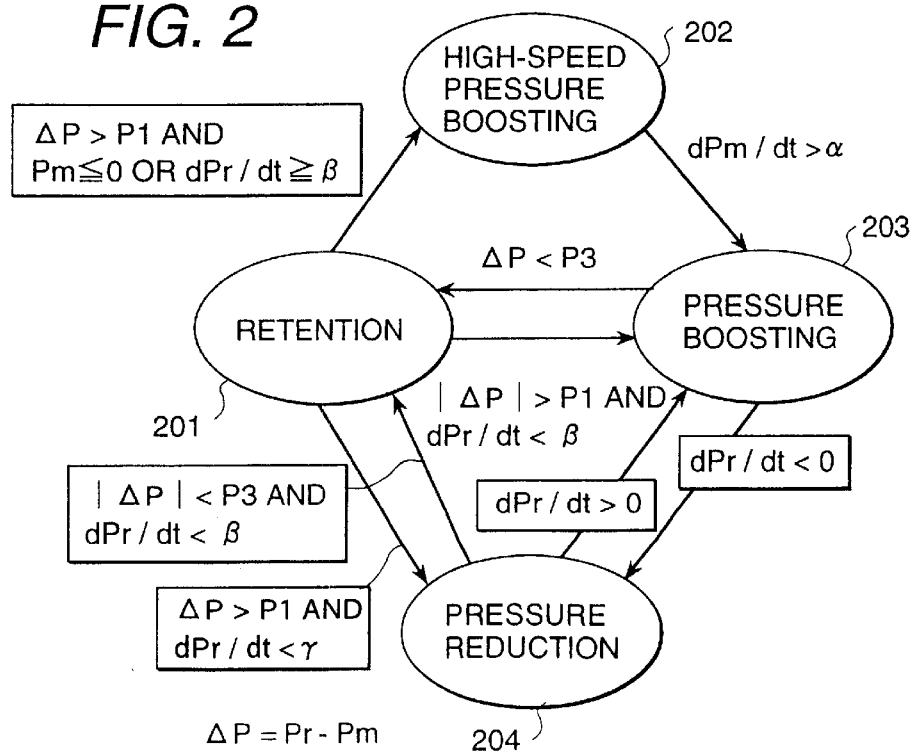
FIG. 2 is a diagram showing state transition for judgement of current command switching.

In this manner, the power booster 101 has a function of controlling opening/closing of the valve mechanism by flowing current to the solenoid to control the pressure in the master cylinder 102. In the high speed pressure increasing current command means, a current command having been adjusted in advance so that the opening area of the valve mechanism becomes maximum is retained. The means 108 for converting pressure-current command at a pressure increasing time converts from a pressure command Pr to a current command Ir, using a relation at a pressure increasing time between a pressure of the pressure sensor 103 and current measured in advance. The means 111 for converting pressure-current command at a pressure decreasing time also converts from a pressure command Pr to a current command Ir, using a relation at a pressure decreasing time of a pressure of the pressure sensor and current in the similar manner. Judgement of the switch judging means 105 is determined, based on a state transition view of FIG. 2.

A cruise controller 117 of this vehicle calculates a target speed on the basis of a speed of this vehicle, a speed of a preceding vehicle and a distance between the this vehicle and the preceding vehicle, and calculates a throttle opening command and fuel injection quantity command of the engine and a pressure command Pr of brake liquid in the master cylinder 102 so that the speed of this vehicle becomes equal to the target speed. The pressure command Pr is transmitted to the present controller 100. The throttle opening command and fuel injection quantity command are transmitted to an engine controller.

An initial state is retention of a retaining state 201, a value of the pressure sensor (hereunder, referred to as pressure Pm) is retained as zero, and the current command Ir at that time is zero. When the pressure command Pr increases, a value of dPr/dt is positive. When it is smaller than a pre-set value $\beta$, the state is shifted to a pressure increasing state 203. This corresponds to a case when the pressure increases slowly. On the other hand, when it is larger than the pre-set value $\beta$, the state is shifted to a high speed pressure increasing state 202. Further, when the pressure Pm is a value other than zero and the state has been shifted from the pressure increasing state 203 or pressure decreasing state 204 to the retaining state 201, the current command Ir is retained at a value searched from the means 109 for converting pressure-current command at a pressure retaining time so that brake force generated by the brake device is kept constant.

Further, in the high speed pressure increasing state 202, a change in the pressure sensor 103 is observed, and when a dPm/dt is larger than a pre-set value $\alpha$, the state is shifted to the pressure increasing state 203. This means that the pressure in the master cylinder 102 increases at a high speed, the speed approaches to an increase speed of the pressure command Pr and it became unnecessary to be the high speed pressure increasing state. In the high speed pressure increasing state 202, the current command Ir is retained at a value at which the brake force generated by the brake device increases at the highest speed.

Further, in the pressure increasing state 203, attention is given to a pressure difference $\Delta$P and the pressure command Pr. In the case where the pressure difference $\Delta$P=Pr−Pm becomes small and becomes smaller than a pre-set value P3 and a time differential of the pressure command Pr becomes smaller than the pre-set value $\beta$, the state is shifted to the retaining state 201. This means that the pressure command does not increase and the pressure command Pr and a value Pm of the pressure sensor 103 became equal to each other. On the other hand, when a time differential dPr/dt of the pressure command became negative, that is, at the time of pressure decrease command, the state is shifted to the pressure decreasing state 204. In this pressure increasing state 203, a feedback control is effected on the basis of the pressure command Pr and the pressure Pm. An intermediate pressure command is calculated from the pressure command Pr and pressure Pm so as to increase following the pressure command changing always, the current command Ir is searched from the means 108 for converting pressure-current command at a pressure increasing time and set. Further, in the pressure increasing state 203, it is sufficient even if the current command Ir is a constant value.

In the pressure decreasing state 204, also, attention is given to the pressure difference $\Delta$P and pressure command Pr. When the pressure difference $\Delta$P=Pr−Pm became smaller than the pre-set value P3 and a time differential of the pressure command Pr became larger than a preset value $\gamma$, the state is shifted to the retaining state 201. This means that the pressure command does not decrease and the pressure command Pr and a value Pm of the pressure sensor became equal to each other. On the other hand, when a time differential dPr/dt of the pressure command becomes positive, that is, at the time of pressure increase command, the state is shifted to the pressure increasing state 203. In this pressure decreasing state 204, a feedback control is effected on the basis of the pressure command Pr and the pressure Pm. An intermediate pressure command is calculated from the pressure command Pr and pressure Pm so as to decrease following the pressure command changing always, the current command Ir is searched from the means 108 for converting pressure-current command at a pressure increasing time and set. Further, in the pressure decreasing state 204, it is sufficient even if the current command Ir is a constant value.

The current command Ir is switched or selected by the current switching means 112, based on those 4 states which are a result of the switch judging means 105. Thereby, it is possible to effect pressure control without decreasing a pressure increasing speed, by using a high speed pressure increasing current command when a pressure increasing speed of the pressure Pm is slow, and using a pressure increasing current command when the pressure increasing speed is sufficiently secured. Further, it is possible to retain the pressure Pm, using a retaining current command when the pressure command does not change, and it is possible to decrease the pressure command Pr and the pressure Pm at a suitable pressure decreasing speed when the pressure command Pr decreases.

Figure 3:
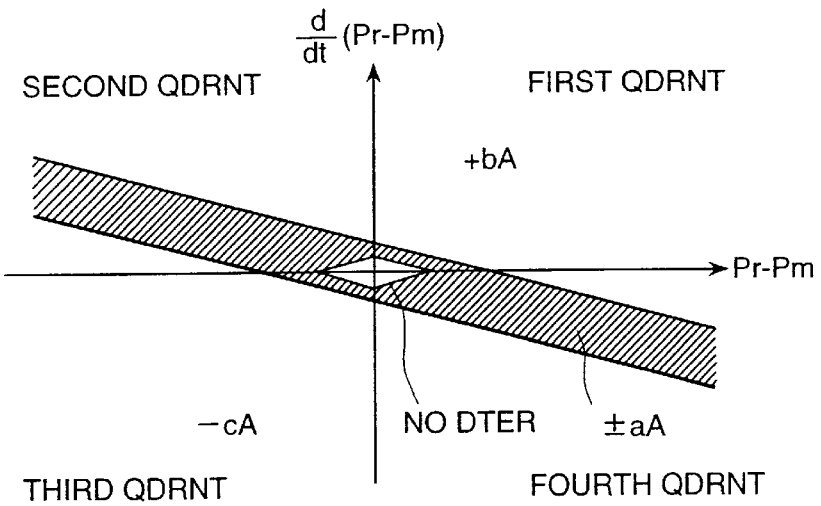
FIG. 3 is a diagram of amplitude switching judgement of a first current dither.
Figure 4:
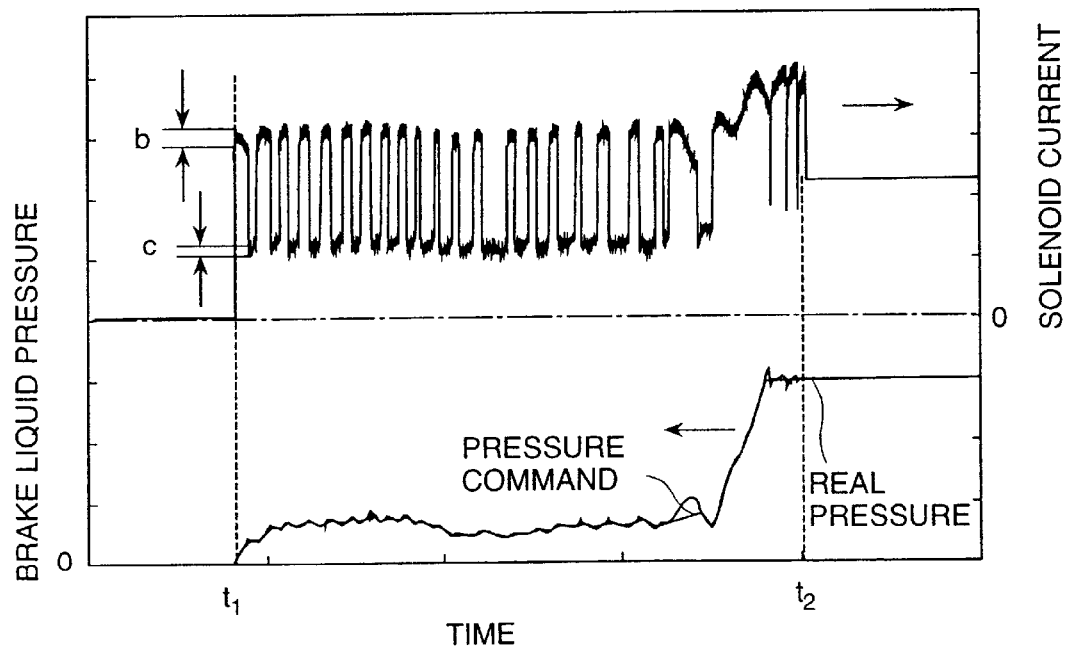
FIG. 4 is a diagram showing an example of a result of pressure control effected based on a diagram of amplitude switching judgement of the first current dither.

Further, by a current dither control 115, it is possible to effect more smooth pressure control. For a current dither, an amplitude of the current dither is determined by a current dither switching judgement 116. A first current dither switching judgement is shown in FIG. 3. In FIG. 3, an abscissa is a difference between a pressure command Pr and a pressure Pm and when the difference is zero the pressure control is well effected. An ordinate is a change rate of a difference between the pressure command Pr and the pressure Pm (d(Pr−Pm)/dt). Four planes divided by the two axes each have the following meaning. In a first quadrant, the pressure command Pr is large and its change rate also is large, so that it is necessary to positively increase the pressure. Therefore, the current dither which is larger by +b (for example, 0.1–0.5 A) than a standard current command Ir is applied. In a second quadrant, also, it is necessary to increase the pressure, so that the current dither which is larger by +b than the standard current command Ir is applied as in the first quadrant. In a third quadrant, the pressure Pm is large, so that it is necessary to positively decrease the pressure. Therefore, the current dither which is smaller by c (for example, 0.05–0.3 A) than the standard current command Ir is applied. In a fourth quadrant, also, it is necessary to decrease the pressure, so that the current dither which is smaller by c than the standard current command Ir is applied as in the third quadrant. Further, a region having a band is provided, in which region the current dither is made to be the standard current command Ir ±a (for example, 0.01–0.1 A) so as to converge on a standard point at which the control is well effected. Further, the dither is not applied to a portion around a cross point of the ordinate and abscissa in which the control is well managed. FIG. 4 is an example of the pressure control based on switching of dither in FIG. 3. The pressure command Pr increases at time t1, and pressure increase and pressure decrease are repeated alternately. When increasing in pressure, a current dither of +b is applied and when decreasing in pressure a current dither of –c is applied. After time t2, the pressure command Pr and the pressure Pm are equal to each other and current for retaining is flowed without application of any dither.

Thereby, current dither is applied when pressure increase or decrease is necessary, the current dither is not applied when the pressure command Pr is constant and it is necessary to increase or decrease the pressure, whereby it is possible to reduce electric wave noises.

Figure 5:
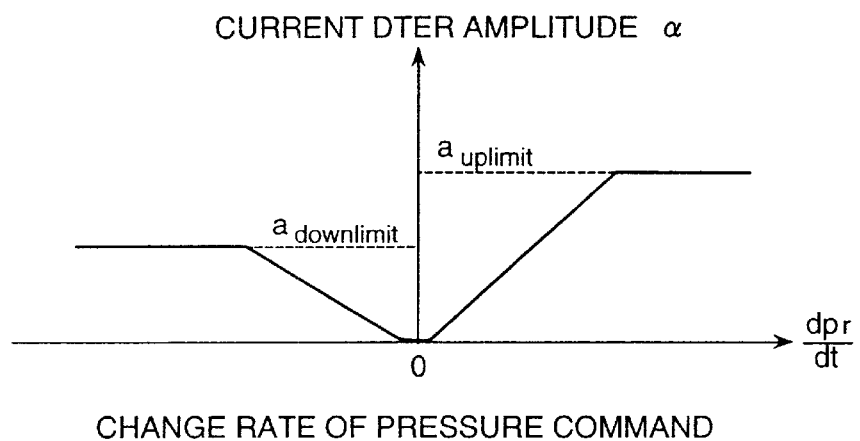
FIG. 5 is a diagram of amplitude switching judgement of a second current dither.
Figure 6:
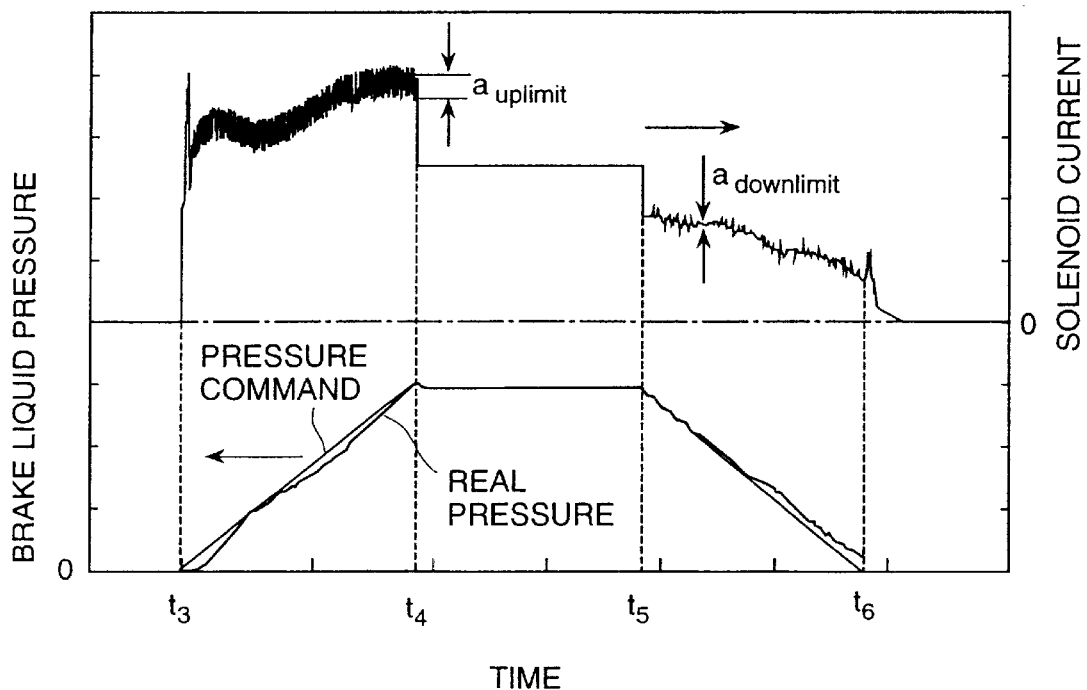
FIG. 6 is a diagram showing an example of a result of pressure control effected based on a diagram of amplitude switching judgement of the second current dither.

In second current dither control, an amplitude of a current dither is determined on the basis of a change rate of pressure command Pr, as shown in FIG. 5. That is, when the pressure command Pr is increasing, the amplitude of the current dither is increased up to an upper limit $a_{uplimit}$ (for example, 1 A) according to an increase in change rate of the pressure command Pr. Further, when the pressure command Pr is decreasing, the amplitude of the current dither is increased up to an upper limit $a_{downlimit}$ (for example, 0.5 A) according to a decrease in change rate of the pressure command Pr. Further, when the change rate of the pressure command Pr is a prescribed value or less, any current dither is not applied. FIG. 6 is an example of the pressure control based on switching of the dither in FIG. 5. The pressure command Pr increases at time t3, and the real pressure Pm smoothly increases according thereto. The pressure command Pr is constant between time t4 and time t5, so that the current dither is zero. The pressure command Pr decreases from time t5 to time t6, and the real pressure Pm smoothly decreases. At this time, the current dither of an amplitude a downlimit is applied. In this manner, the current dither is determined on the basis of FIG. 5, whereby the current dither is applied when it is necessary to increase or decrease the pressure, and the current dither is not applied and it is possible to reduce electric wave noises when the pressure command Pr is constant and it is unnecessary to increase or decrease the pressure.

According to the present invention, it is possible to effect pressure control without decreasing a pressure increasing speed the cause of which is a pressure change in the operation pressure chamber, using a high speed pressure increase current command when a pressure increasing speed due to the pressure in the operation pressure chamber is slow, and using a pressure increase current command when the pressure increasing speed is sufficiently secured.

Further, by determining a current dither amplitude on the basis of a difference between the pressure command Pr and the pressure Pm and a time change, it is possible to minimize the time of application of the current dither and effect smooth pressure control with less electric wave noises.

Further, by determining a current dither amplitude on the basis of a time change of the pressure command Pr, also, the time in which current dither is applied is minimized and it is possible to effect smooth pressure control with less electric wave noises.

What is claimed is:

1. A controller of a vacuum brake power booster for amplifying an input of a brake pedal and outputting to a brake device, and for adjusting openings of a vacuum valve and an atmosphere valve by controlling current in a solenoid incorporated therein, comprising:

means for generating pressure-increasing signals to open said atmosphere valve;

means for generating pressure-decreasing signals to open said vacuum valve;

means for generating retaining signals to close said atmosphere valve and said vacuum valve; and means for switching to or selecting one from a plurality of signals generated by said respective means on the basis of an input different from the input of said brake pedal.

2. A controller of a vacuum brake power booster according to claim 1, wherein said means for switching or selecting switches to or selects one from the following signals (a) to (c):

(a) signals from said means for generating pressure-increasing signals when a pressure command is increasing, (b) signals from said means for generating pressure retaining signals when the pressure command is constant, and (c) signals from said means for generating pressure-decreasing signals when the pressure command is decreasing.

3. A controller of a vacuum brake power booster for amplifying an input of a brake pedal and outputting to a brake device, and for adjusting openings of a vacuum valve and an atmosphere valve by controlling current in a solenoid incorporated therein, comprising:

means for generating a pressure-increasing signal to open said atmosphere valve;

means for generating pressure-decreasing signal to open said vacuum valve;

means for generating a retaining signal to close said atmosphere valve and said vacuum valve; and means for switching to or selecting one from a plurality of signals generated by said respective means on the basis of an input different from the input of said brake pedal; and means for switching and changing amplitudes of said plurality of signals generated by said plurality of means every control repetition cycle, on the basis of at least a brake liquid pressure command and a brake liquid pressure.

4. A controller of a vacuum brake power booster for amplifying an input of a brake pedal and outputting to a brake device, and for adjusting openings of a vacuum valve and an atmosphere valve by controlling current in a solenoid incorporated therein, comprising:

means for generating a pressure increasing signal to open said atmosphere valve;

means for generating pressure decreasing signal to open said vacuum valve;

means for generating a retaining signal to close said atmosphere valve and said vacuum valve; and means for switching to or selecting one from a plurality of signals generated by said respective means on the basis of an input different from the input of said brake pedal; and means for switching and changing amplitudes of said plurality of signals generated by said plurality of means every control repetition cycle, on the basis of at least a brake liquid pressure command.

5. A controller of a vacuum brake power booster according to claim 3, wherein said means for switching and changing amplitudes of said plurality of signals is operable only when a change rate of a difference between the brake liquid pressure command and the brake liquid pressure and the difference are larger than respective preset values.

6. A controller of a vacuum brake power booster according to claim 3, wherein said means for switching and changing amplitudes of said plurality of signals changes the amplitudes according to change rates of the brake liquid pressure command.

7. A controller of a vacuum brake power booster according to claim 4, wherein said means for switching and changing amplitudes of said plurality of signals is operable only when the brake liquid pressure command is larger than a preset value.

8. A controller of a vacuum brake power booster according to claim 4, wherein said means for switching and changing amplitudes of said plurality of signals changes the amplitudes according to change rates of the brake liquid pressure command.

* * * * *